W. B. WILLIAMS & G. A. McDOUGALL.
TAPE MEASURE.
APPLICATION FILED APR. 13, 1917.
1,264,466.
Patented Apr. 30, 1918.
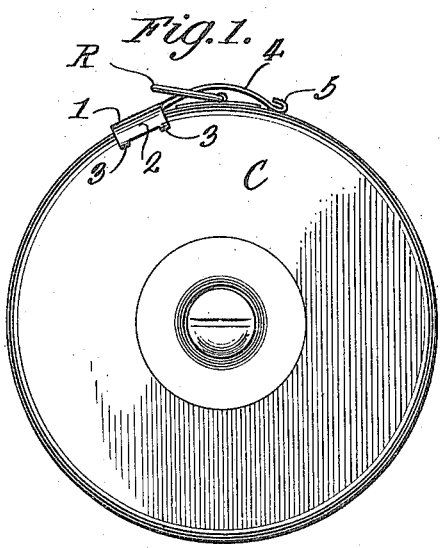
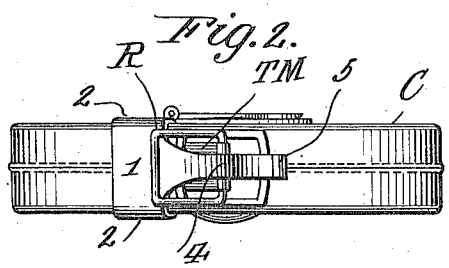
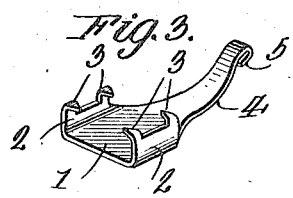
INVENTOR
Wayland B. Williams
George A. McDougall
WITNESSES
BY Richard B. Owen.
ATTORNEY

UNITED STATES PATENT OFFICE.

WAYLAND B. WILLIAMS AND GEORGE A. McDOUGALL, OF OAKLAND, CALIFORNIA.

TAPE-MEASURE.

1,264,466.  Specification of Letters Patent.  Patented Apr. 30, 1918.

Application filed April 13, 1917. Serial No. 161,926.

*To all whom it may concern:*

Be it known that we, WAYLAND B. WILLIAMS and GEORGE A. McDOUGALL, citizens of the United States, residing at Oakland, in the county of Alameda and State of California, have invented certain new and useful Improvements in Tape-Measures, of which the following is a specification.

This invention relates to improvements in tape measures.

The object of the invention is to provide a simple and efficient attachment for tape measures to retain them in place, and to prevent them from unrolling and becoming disconnected from the casing in which they are wound.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a side elevation of a tape measure casing equipped with this improved attachment, with the measure shown completely housed within the casing, and Fig. 2 is an edge view of a measure equipped with this invention, Fig. 3 is a detail perspective view of the attachment detached.

The attachment constituting this invention is shown applied to a tape measure casing C of ordinary cylindrical construction and in which the tape is wound and normally retained by spring means not shown. The free end of the tape is provided with a ring R here shown substantially rectangular in form, although obviously it may be of any other desired configuration and may be secured in any suitable manner to the tape measure TM. This attachment comprises a plate 1 of a width corresponding substantially to the depth of the casing C and is provided at its opposite side edges with right angular flanges 2 extending in the same direction and adapted to clampingly engage the ends of the casing and are provided on their free edges with inturned spurs 3, two of which are shown here mounted on each flange, but obviously any desired number may be employed. These spurs 3 are designed to engage the opposite faces of the casing C as is shown in Fig. 1 and by means of which the attachment is detachably secured to the casing and held against pivoting. An outwardly bowed spring tongue 4 extends longitudinally from the front end of the plate 1 and tapers toward its free end, said end being bent outwardly and backwardly as shown at 5 with its lower face resting on and engaging the edge of the casing C to form a space between it and the casing wall to provide for the positioning between them of the ring carried end of the measure (see Figs. 1 and 2). The free end 5 of this spring tongue 4 frictionally engages the edge of casing C and is designed to bear on the tape measure TM when the latter is drawn out through the casing for measuring or other purposes so that it is held at any desired position and prevented from accidentally unwinding.

When the tape measure is wound up within the casing C the ring R on its free end has the tongue 4 passed therethrough as shown in Figs. 1 and 2 and said ring is folded backward over said tongue and its outwardly bulged portion, the resiliency of the tongue operating to hold it in this position.

From the above description it will be obvious that this attachment may be of any desired size to fit the casing of the measure to which it is to be applied, and when applied it will operate in the manner above set forth for retaining the tape measure and preventing its becoming accidentally unwound and which also prevents the ring R from being torn off by the force of the spring which operates to wind up the tape measure within the casing, owing to the engagement of the free end of said ring with tongue 4 whereby the tape connected end is held spaced from the wall of the opening in the casing.

From the foregoing description, taken in connection with the accompanying drawings, the advantages of the construction and of the method of operation will be readily apparent to those skilled in the art to which the invention appertains and while we have described the principle of operation of the invention together with the device which we now consider to be the best embodiment thereof, we desire to have it understood that the device shown is merely illustrative and that such changes may be made as are within the scope of the claimed invention.

We claim:

1. An attachment for incased tape measures, the tape of which has a ring at its free end comprising a plate having laterally extending side flanges provided at their free edges with spaced inturned spurs for detachable connection with the ends of a casing, and a forwardly projecting outwardly bowed spring tongue carried by said plate and adapted to pass through the ring on the tape and having its free end curved upwardly for engagement with the tape measure to hold it in place and prevent it from unrolling accidentally.

2. An attachment for incased tape measures comprising a substantially rectangular plate of a width corresponding to the depth of the casing to which it is to be applied, and having flanges extending at right angles in the same direction from the opposed side edges thereof, said flanges each having a plurality of inturned spurs on their free edges, and a tongue extending longitudinally forward from the front end of said plate and bowed outwardly from its base to its free end with its terminal upturned and bent inwardly and adapted to engage the periphery of the casing to which the device is to be applied.

In testimony whereof we affix our signatures in presence of two witnesses.

WAYLAND B. WILLIAMS.
GEORGE A. McDOUGALL.

Witnesses:
E. SHEEHAN,
H. E. AUNE, Sr.

Copies of this patent may be obtained for five cents each, by addressing the "Commissioner of Patents, Washington, D. C."